(12) United States Patent
Lipovski

(10) Patent No.: US 7,856,203 B2
(45) Date of Patent: Dec. 21, 2010

(54) SYSTEM FOR INHIBITING TEXTING AND SIMILAR DISTRACTIONS WHILE DRIVING MOVING VEHICLES

(75) Inventor: Gerald John (Jack) Lipovski, Austin, TX (US)

(73) Assignee: CourteousCellphones LLC (Texas), Austin, TX (US)

( * ) Notice: Subject to any disclaimer, the term of this patent is extended or adjusted under 35 U.S.C. 154(b) by 0 days.

(21) Appl. No.: 12/785,449

(22) Filed: May 22, 2010

(65) Prior Publication Data

US 2010/0234047 A1 Sep. 16, 2010

Related U.S. Application Data

(63) Continuation-in-part of application No. 11/865,810, filed on Oct. 2, 2007, which is a continuation-in-part of application No. 11/511,723, filed on Aug. 29, 2006, now Pat. No. 7,363,042, which is a continuation of application No. 10/687,024, filed on Oct. 16, 2003, now Pat. No. 7,142,877, which is a continuation of application No. 09/384,723, filed on Aug. 27, 1999, now Pat. No. 6,675,002.

(60) Provisional application No. 60/936,605, filed on Jun. 21, 2007.

(51) Int. Cl.
*H04K 3/00* (2006.01)

(52) U.S. Cl. .......................... 455/1; 455/418; 455/420; 455/466

(58) Field of Classification Search .................. 455/1, 455/414.1, 418–420, 456.4, 466, 404.2
See application file for complete search history.

(56) References Cited

U.S. PATENT DOCUMENTS

| 2009/0111422 A1* | 4/2009 | Bremer et al. ........... 455/404.2 |
| 2009/0221279 A1* | 9/2009 | Rutledge .................... 455/418 |
| 2009/0275281 A1* | 11/2009 | Rosen .......................... 455/1 |
| 2010/0229217 A1* | 9/2010 | Bhatia ........................... 726/4 |

* cited by examiner

*Primary Examiner*—CongVan Tran

(57) ABSTRACT

A system is disclosed for preventing moving vehicle drivers from cell phone texting while that vehicle is moving. This system comprises a motion detector and a moving vehicle's contiguous interior compartment containing at least four courtesy signal transmitters and at least one conventional cell phone having a text keyboard, a microphone, and a courtesy signal receiver disposed in the microphone which is in the keyboard. This compartment may also have devices in it which control the speed and direction the moving vehicle will go, and if so, it may have a moving vehicle driver, who may also be the aforementioned cell phone user, located to operate these devices. The cell phone may enable or disable the keyboard based on courtesy signal transit times and the motion indicator, but this determination may be overridden by the cell phone service provider, or person of authority located in the vehicle's contiguous interior compartment.

19 Claims, 3 Drawing Sheets

SYSTEM FOR INHIBITING TEXTING AND SIMILAR DISTRACTIONS WHILE DRIVING MOVING VEHICLES

RELATED U.S. APPLICATION DATA

This application is a continuation-in-part of application Ser. No. 11/865,810, filed Oct. 2, 2007, which is a continuation-in-part of application Ser. No. 11/511,723, filed Aug. 29, 2006, now U.S. Pat. No. 7,363,042, which is a continuation of application Ser. No. 10/687,024, filed Oct. 16, 2003 now U.S. Pat. No. 7,142,877, which is a continuation of application Ser. No. 09/384,723, filed Aug. 27, 1999 now U.S. Pat. No. 6,675,002. This application also claims benefit of U.S. Provisional Application No. 60/936,605, filed Jun. 21, 2007. These applications and patents are incorporated herein by reference.

BACKGROUND OF THE INVENTION

This invention is in the field of automatically preventing a moving vehicle's driver from texting and doing other similar excessively dangerous activities.

Recently, a widely watched daytime television show challenged individuals in its audience to sign a commitment to "No Phone Zones", to stop using cellular telephones in places, especially moving vehicles, where such activities are dangerous, citing many examples of horrible accidents in which a vehicle's driver was distracted by their using these cell phones. The inventor believes that audience members signing a commitment will not satisfactorily solve the problem, but a technological solution will be needed.

In this inventor's prior patents and applications which have been incorporated by reference, ultrasonic or low-power radio "control" signals by doorways at entrances to or exits from a restricted area, or throughout the "area", disable or enable cell phone components, such as keyboards, but disabling can be overridden by the cell phone service provider if an emergency requires the cell phone to be enabled. Disabling the keyboard means not recognizing key strokes after more than, say, three pressings of any keyboard key in a predetermined time period, say, 10 seconds, to nevertheless allow a user to dial an emergency number such as 911, or to speed dial often used numbers. Disabling a keyboard in this way would deter a moving vehicle's driver from being distracted by texting a lot of characters. Herein, the inventor applies the concepts and techniques of these prior patents, and an application, specifically to the problem of preventing moving vehicle's drivers from using cell phones while the vehicle s in motion. Specific significant techniques include using ultrasonic courtesy signal transit times to locate where the cell phone is at inside the vehicle, and using overrides to allow some action for some special case of a more general case where the activity is not allowed for the general case. In discussing the specific art in this disclosure, the prior art's term "control signal" is replaced with this disclosure's "courtesy signal", the prior art's term "area" is replaced with this disclosure's "zone", the system comprising a cell phone incorporating a courtesy signal transmitter and courtesy signal receiver, is a "courteous cell phone system", and a cell phone that has the capabilities described herein is "courtesy cell phone compliant".

SUMMARY OF THE INVENTION

The present invention involves a system operating in a moving vehicle, comprised of a motion detector in or under this vehicle, and a vehicle's contiguous interior compartment which has at least four courtesy signal transmitters and a conventional cell phone with keyboard, incorporating a courtesy signal receiver, wherein these courtesy signal transmitters send courtesy signals to the courtesy signal receiver. Based on information provided by the courtesy signal and motion detector, the keyboard (and possibly the cell phone's display) are disabled or enabled. In subsequent discussions, wherever the keyboard is enabled, the cell phone's display could be automatically enabled with it, and wherever the keyboard is disabled, the cell phone's display could be automatically disabled.

Transmitters disposed within the vehicle's contiguous interior compartment periodically send a courtesy signal to the cell phone. These signals are sent at times equally spaced throughout a cycle, one at a time. The time of arrival of the signals at the cell phone's receiver is used in either a GPS-like analysis, or else trilateration, that uses ultrasonic signals to determine if the cell phone is close to the driver's wheel, which might disable the cell phone's keyboard.

Among several techniques to determine motion, a conventional GPS receiver can be used, and is attractive if the cell phone already has a GPS receiver. A number of preferred embodiments are possible, which demonstrates the flexibility of this approach. Measures are described that can render inoperable one of these embodiments, and countermeasures employing patent protection are described, which should render it generally operable.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF PREFERRED EMBODIMENTS

Figure 1:
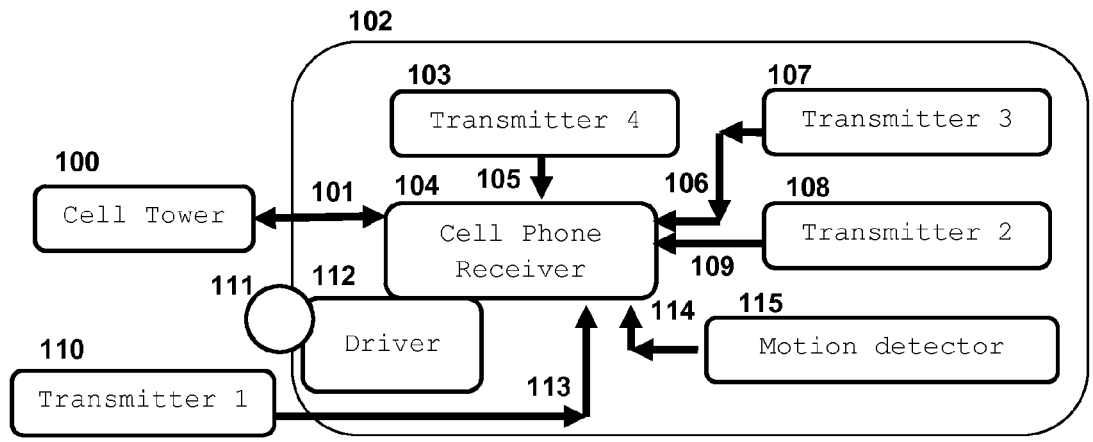
FIG. 1 is a diagram mostly representing the contiguous interior compartment of a moving vehicle, showing the components of the courteous cell phone system.

The present invention provides a system for restricting a cellular telephone's operations in a contiguous interior space 102 where the moving vehicle's driver 112 must be located. The system shown in FIG. 1 is comprised of at least four ultrasonic courtesy signal transmitters 110, 103, 107, 108, and at least one cell phone 104, all disposed within the moving vehicle's contiguous interior space 102. A courtesy signal receiver is embedded in this cell phone 104. A motion detector 114 is disposed in the cell phone 104, in the contiguous interior space 102, or under the vehicle. The four courtesy signal transmitters can usually be disposed in the stereo speakers located near the four corners of the moving vehicle's contiguous interior compartment 102, which reduces the risk that a user might disconnect these courtesy signal transmitters, because of the difficulty of removal and then re-mounting the coverings in which the speakers are fastened. Further, the vehicle's electrical power and information cabling can be secured so that cutting or removing the cables to disable the courtesy signal transmitter, or removing that transmitter, will also disable the speakers, and/or generate error messages.

Each transmitter 110, 103, 107, 108 periodically sends a courtesy signal along paths: 113, 105, 106, 109, to the cell phone 104. These signals from the four transmitters are sent one at a time, repetitively in a cycle. For instance, for some initial time t0 and some transit time t, transmitter 110 sends a courtesy signal starting precisely at time t0, transmitter 103 sends a courtesy signal precisely starting at time t0+t, transmitter 107 sends a courtesy signal precisely starting at time t0+2*t, transmitter 108 sends a courtesy signal precisely starting at time t0+3*t, transmitter 110 resends its courtesy signal precisely starting at time t0+4*t, and so on, cyclically. The other transmitters that are not transmitting may try to detect the ultrasonic courtesy signal sent from the transmitter that is transmitting, to determine if the sending transmitter is not disabled or squelched, and not swamped by a jamming device. For instance, when transmitter 110 sends a courtesy signal, transmitter 103, transmitter 107, and transmitter 108 receives the courtesy signal well enough to determine that it is being properly sent. The time of arrival of these signals at the cell phone's receiver is obtained. A method like that used in GPS widely used for global positioning can be used with these much slower ultrasonic signals to determine the interior location of the cell phone 104. Alternatively, using any three of the four signals, the cell phone 104 can use trilateration to determine its location. From this information, obtaining the cell phone 104 location inside the vehicle's contiguous interior space, the cell phone's keyboards may be disabled if the cell phone 104 is close to the driver's wheel; otherwise the cell phone's keyboards are enabled. The zone, where cell phone keyboards can be disabled, should be encompassing enough so that if a driver in any posture could press any key when the phone's keyboard is to be disabled, the cell phone 104 will be in this zone so that its keyboard would be disabled.

The motion sensor 115 can be implemented in several ways. In a first implementation, attractive if the cell phone 104 already has a built-in conventional GPS receiver that continually reads out the location of the vehicle, speed is determined as a change in location per time to make that change, and motion is present if the speed exceeds some predetermined threshold speed. Such a mechanism to determine motion can be done within the cell phone 104 and does not need a courtesy signal to convey the presence of motion to the cell phone.

In a second implementation, attractive if there is a secure way to send the speed from the vehicle to the cell phone 104, speed is obtained from the moving vehicle's speedometer. The indication of motion 114 can be implemented using a courtesy signal like 113, 105, 106, or 109, to the cell phone 104. In this case, there would be five consecutive time slots in the aforementioned cycle, four to send the distance and one to send the motion indication.

Other implementations observe a property that depends on motion. One of these implementations, the third implementation in this specification, motion is sensed as acceleration determined by an accelerometer integrated circuit chip such as is used in Nintendo Wii game motion sensors. The motion could be determined at some location on the vehicle's the frame, such as the non-rotating part of the wheel axle assembly, and sent to the cell phone 104 via a courtesy signal, like the speedometer-determined courtesy signal was sent. If there is significant acceleration and deceleration, the vehicle must be moving.

A fourth possible implementation, also dependant on some property that accompanies motion, such as sensing "engine noise", "ground noise" or "wind noise" detectable by the cell phone's microphone 156. If there is significant engine, ground or wind noise, the vehicle must be moving. Such a mechanism to determine motion can be done within the cell phone 104 and does not need a courtesy signal to convey the presence of motion to the cell phone 104.

Figure 2:
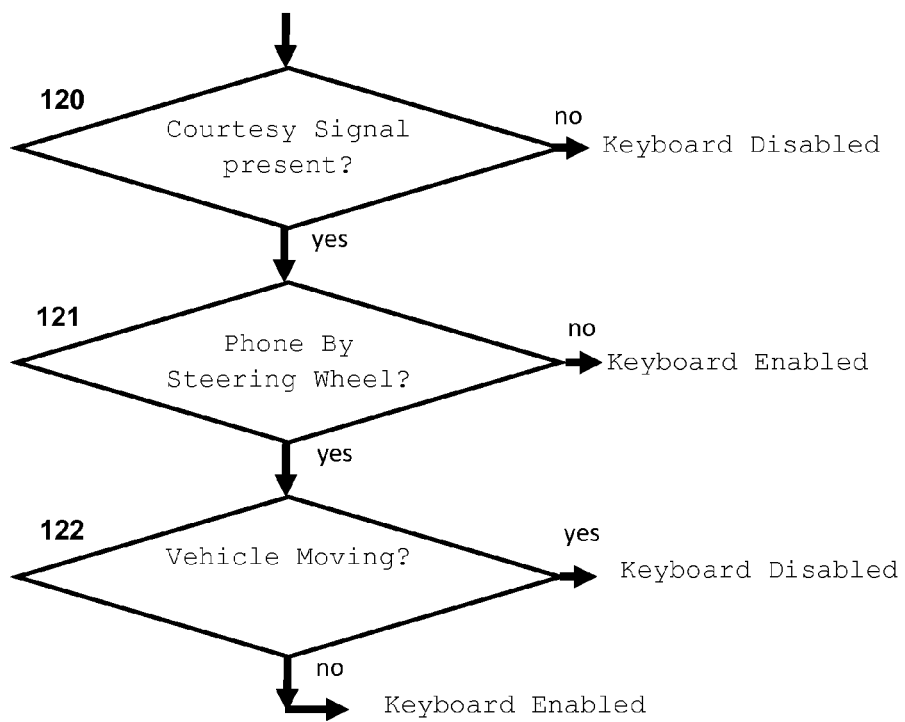
FIG. 2 is a flow chart for a first preferred embodiment.

A first preferred embodiment of the testing to determine if the keyboard should be disabled is flow charted in FIG. 2. Herein a speedometer-based motion sensor or an accelerometer-base motion sensor detects that the vehicle is or is not moving. First, a check is made to see if courtesy signals are present 120; if not present, the cell phone keyboard is disabled. Otherwise, if valid courtesy signals are being received, they are used to determine if the cell phone 104 is near the driver's steering wheel 121. If the cell phone 104 is not near the driver's wheel, the cell phone keyboard is enabled. Otherwise, the motion detect signal is observed 122. If the motion sensor detects that the vehicle is moving, cell phone's keyboards are disabled, otherwise if the vehicle is not moving, the cell phone keyboard is enabled.

This first embodiment would be suitable for a vehicle in which all the cell phones are permanently kept inside the vehicle, wherein courtesy signals are always present. It might be offered as an OEM package that can be installed in new cars. For instance, in a seven-passenger minivan, six courteous cell phones could be disposed at the six passenger seats. The driver would not be able to use any of these cell phones for texting or other dangerous tasks without being reseated in a passenger seat. The passengers could keep their cell phones that are not courtesy cell phone compliant, stowed in the vehicle's trunk or a suitcase, out of reach of the driver. A parent in the minivan could have capability to disable any cell phone keyboard, for instance to punish an unruly child. This implementation would be advantageously used, like DVDs that are mounted in the ceiling or back of a seat of a minivan, to keep even adult passengers happy.

Figure 3:
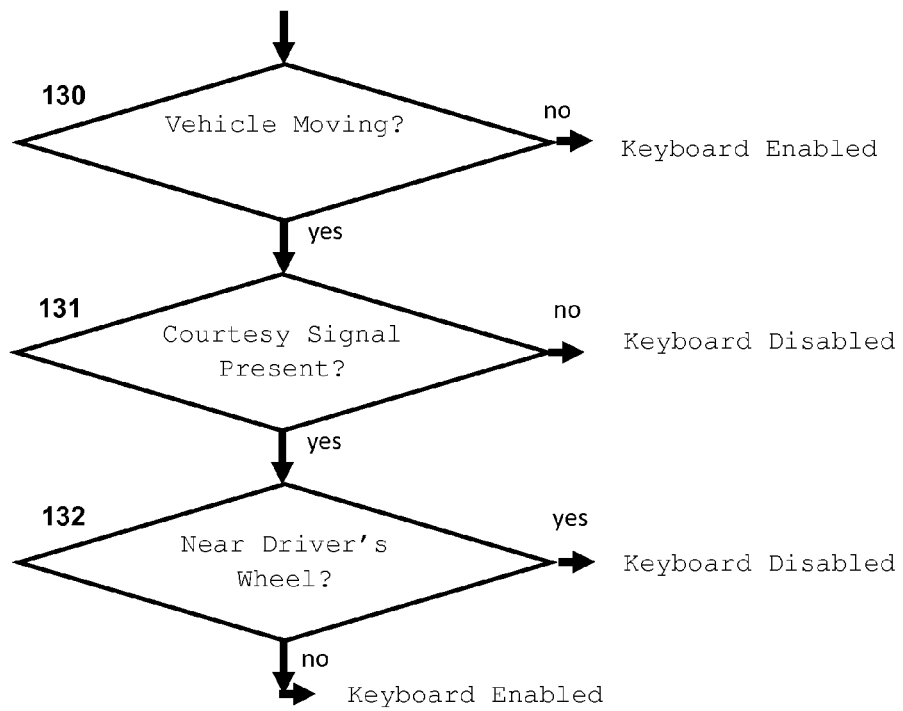
FIG. 3 is a flow chart for a second preferred embodiment.

In a second preferred embodiment, motion is determined by a conventional GPS system present in the cell phone, or by detecting engine, wind or road noise through the cell phone's microphone 156. The courtesy signals determine if the cell phone's keyboard is enabled or disabled, using a sequence of tests shown in FIG. 3. If no significant motion is observed 130, then the keyboard is enabled. Otherwise a check is made to see if courtesy signals are present 131; if such signals are not present, the cell phone keyboard is disabled. Otherwise if valid courtesy signals are present, they are used to determine 132 if the cell phone 104 is near the driver's steering wheel 111. If they are not near the driver's wheel, the keyboard is enabled, and if they are near the driver's wheel the keyboards are disabled.

This second preferred embodiment allows the courteous cell phone system to operate fully when the cell phone 104 is used inside a zone, such as the contiguous interior of a moving vehicle, in which the courtesy signals are present and valid, and it allows texting by users outside such zones if the cell phone 104 is not moving. So the user can use all cell phone features in the office or home, but would not allow texting in any moving vehicle, including busses, trains, and airplanes, that do not have courtesy signal transmitters installed in them. However, if the courtesy signal transmitters are properly installed in such moving vehicles, including busses, trains, and airplanes, responsive to requests from enough passengers, then the courteous cell phone system would operate fully in them too.

The user may try to defeat the courteous cell phone system following either of the above preferred embodiments by generating a signal that appears to the signal's receiver as a proper signal to allow texting; this can be adequately handled by using encrypted binary values of the data that are coded differently at different times, or that are coded differently at different locations, or both. For instance, if the cell phone 104 has a built in GPS receiver, the courteous cell phone transmitter can be designed to have a GPS receiver incorporated in it so that the courtesy signal transmitter and courtesy signal receiver utilize the same the aforementioned location and times provided by the GPS receiver to first encode and then decode an encrypted signal. These measures should be adequate, in systems according to the first two embodiments, to prevent enabling the keyboard when it should be disabled.

Nevertheless, the inventor claims these measures as his intellectual property, with the intent of prosecuting for patent infringement any company that tries to manufacture, distribute, or sell the apparatuses that incorporate these aforementioned measures. While there appears to be no way to completely prevent all moving vehicle drivers from texting while in motion, because some mischievous experimenter might build a couple of them, large scale manufacturing, distributions or sale of apparatuses employing these measures need to be stopped, or else the first two preferred embodiments will be inoperable. Thus these attachable apparatuses that generate fake control signals, causing the system to operate improperly, are claimed by this inventor.

Figure 4:
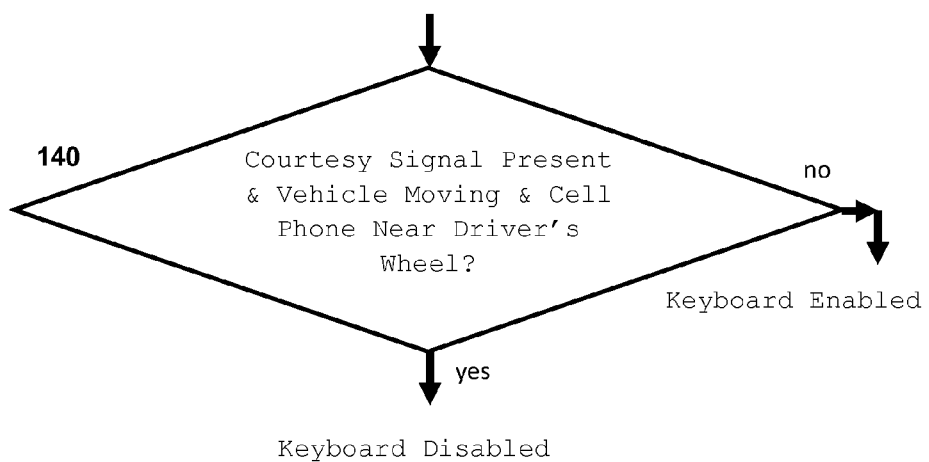
FIG. 4 is a flow chart for a third preferred embodiment.

In a third preferred embodiment flow charted in FIG. 4, motion is determined by any means discussed above. If the vehicle is moving, valid courtesy signals are detected, and the cell phone 104 is near the steering wheel, the keyboard is disabled. Otherwise it is enabled.

This third preferred embodiment must carefully protect the courtesy signal path. A user could de couple the path by interfering with or squelching the courtesy signal, so that no valid courtesy signals reach the courtesy signal receiver. Then the cell phone keyboard would be enabled even if it should be disabled. So the user can use all features of the cell phone 104 without limit, completely rendering inoperable the intended purpose of this system. The courtesy signals are difficult to decouple or squelch near the speaker, as discussed earlier. However, the user may attempt measures to decouple or squelch the courtesy signal at its receiver. In order to be sure that the courtesy signal receivers are getting courtesy signals if they are present, countermeasures will be used.

Firstly, the courtesy signal receiver is implemented as a higher ultrasonic frequency extension of the user's audio microphone 156's response, and is disposed inside the microphone, so that if the user wishes to squelch the courtesy signal which is received at the microphone 156, the microphone audio input is also squelched. While texting really does not need to utilize the microphone and could continue operation without having to use the squelched microphone 156, voice communication does use both keyboard to dial and microphone 156 to talk. When dialing more than three digits for a voice call, either the audio would be squelched or the keyboard would be disabled. Neither option is acceptable.

Secondly, the engine, ground and wind noise received by the cell phone microphone 156 can be monitored. If the courtesy signal receiver is squelched, the audio noise level should be significantly reduced. When this noise level is be low a predetermined threshold, the keyboard can be disabled.

Figure 5:
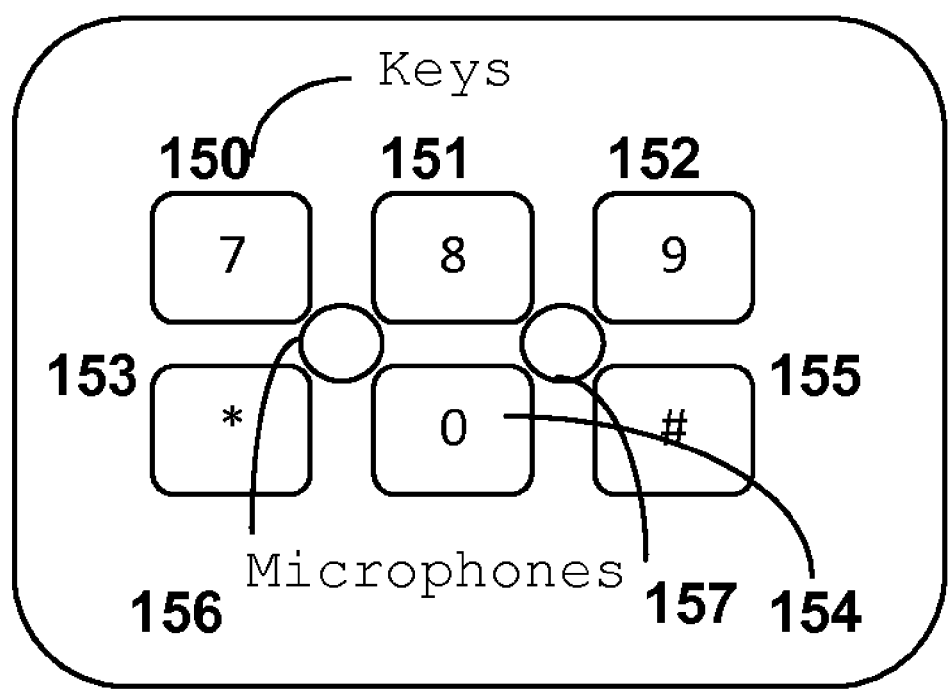
FIG. 5 shows a diagram of part of a simple cell phone whose bottom part of the keyboard houses two microphones.

Thirdly, as a further precaution the cell phone microphone (s) can be disposed in the keyboard. FIG. 5 shows, in cell phone, keys 150 to 155 of a keyboard with a pair of microphones (also courtesy signal receivers) 156 and 157, so that the user would have some difficulty pressing keys adjacent to the microphone 156 when the microphone is squelched by pressing some gob of material over the microphone 156 cavity. If two microphones are disposed in two different places, as shown in FIG. 5, squelching both microphones is more difficult than squelching one.

Observe that the three preferred embodiments utilize similar sensor subsystems and nearly identical processing operations, wherein the most significant differences are in the order in which the inputs are examined. It should be possible to implement a cell phone system that can be configured to follow one of the preferred embodiments by rewriting a changeable non-volatile variable that selects which embodiment to use.

If a microphone-equipped headset connected by an audio cable to the cell phone 104 is used, the microphone 156 disposed in the keyboard should still be used as the courtesy signal receiver, employing the noise test and interference with pressing some keys that is provided by this mechanism. Further, the wind and engine noise sensed by both the headset's microphone and the cell phone's microphone 156 can be compared. If these noise levels are significantly different, the keyboard can be disabled.

The measures to render this third preferred embodiment inoperable are (1) block all paths between the courtesy signal transmitter and the courtesy signal receiver, such as by putting the cell phone 104 in an ultrasonically blocking cage or enclosure, and (2) generate or play back ground and wind noise. (Note that these problems only appears in the third preferred embodiment and are not a problem in the first two embodiments.) In the first case, the enclosure must permit voice to pass through it from the speaker to the headset, but block the courtesy signal to a level lower than the courtesy signal receiver can acquire the signal, provide visual view of the cell phone display, and have a way for the user to press the keyboard's keys. For the second case, an audio signal generator and some kind of audio speaker would need to be coupled to the cell phone microphone 156. If the speed is known to the cell phone's processor, this speaker sound input to the microphone 156 could be compared in the cell phone against of the kind of road and wind noise expected as a function of speed, which is known to the cell phone's processor, to provide a way to recognize the difference between recorded or generated noise and true noise. It won't be easy for a user to generate a realistic sound, or have a recorded realistic sound be played back, to trick the cell phone 104 into assessing that no courtesy signal is present.

In each of these preferred embodiments, if the cell phone service provider is contacted in the event of an emergency, he or she can give a command over the cell phone's voice and data channel 101 sent from the cell phone tower 100, to force the cell phone 104 located in the moving vehicle's interior space to enable or disable the cell phone keyboard, regardless of where the cell phone 104 is located in the vehicle. Also, since dialing 911 is permitted in this system, if the cell phone user has an emergency, he or she can override this system to get help. The cell phone service provider should have the ability to change the cell phone's action of disabling the keyboard, to the action of printing an error message on the cell phone, but not disabling the keyboard, in order to gradually overcome the vehicle's driver from his or her habit of texting while driving. This alternate action might be based on the user's phone number and be specific to just the cell phone having that number, or based on the location of the cell phone tower that communicates with the cell phone 104, to apply to all cell phones sending or receiving data through that tower 100. Finally, the cell phone service provider or a person of authority over the zone, such as a train conductor that has authority over the train, might have the ability to enable all cell phones in a car in the train. All cell phone users in the train car would be able to text. Conversely, in the aforementioned minivan, the moving vehicle driver should have the ability to disable the keyboards of any or all passenger's cell phones, using only equipment disposed within the moving vehicle's contiguous interior space, in order to punish cell phone user(s) for bad behavior.

Some differences between the use of GPS-like evaluations in the courteous cell phone system used in the above preferred embodiments, and conventional GPS systems are noted herein. With regard to the signal, the former GPS-like system utilized ultrasonic signals with slow transit times (about 1.25 feet per millisecond) while the later are radio-frequency signals with fast transit times (about a foot per nanosecond). Due to this difference, if operated like the conventional GPS system which utilizes at least four receivers operating simultaneously in parallel, the courtesy signal receiver would require four rather large antennae. Instead, the courtesy signal receiver uses one receiver to get the timing from each courtesy signal receiver one at a time sequentially, requiring only one ultrasonic sensor. Also the slower speed of the ultrasonic courtesy cell phone system means that a standard microcontroller with a counter-timer I/O module can generate and receive courtesy signals. Thus the inventor believes that an ultrasonic GPS system used within the courteous cell phone system to determine the location of the cellular phone in the moving vehicle's contiguous interior is not just a radio-frequency GPS system implemented with a different signal carrier, but a near relative of it. Nevertheless, the system described in this disclosure could be implemented with radio-frequency signals if faster signal processing systems could be developed. Therefore the inventor claims radio-frequency signal based GPS systems which a person of ordinary skill in the art could develop from the ultrasonic signal based GPS disclosed in this specification.

Modifications to this invention can be made by one skilled in the art without departing from the spirit of the invention. While the invention has been described in connection with illustrative embodiments, obvious variations therein will be apparent to those skilled in the art without the exercise of invention, accordingly the invention should be limited only to the scope of the appended claims.

I claim:

1. A system for preventing moving vehicle's drivers from engaging in cell phone texting and similar dangerous activity while said moving vehicle is in motion, comprising:
    (a) A motion detector, able to provide an indication that said moving vehicle is in motion, and
    (b) A contiguous interior compartment wherein passengers may be located, said contiguous interior compartment having:
        (i) at least four courtesy signal transmitters disposed within said contiguous interior compartment,
        (ii) at least one cell phone operated by a cell phone user, having a radio frequency voice and data carrier signal transceiver capable of carrying at least text messages between the cell phone in said moving vehicle and another cell phone, having a display able to read received text, having a processor capable of controlling said cell phone, having a microphone to receive audio signals spoken by said cell phone user, and having a courtesy signal receiver incorporated in said microphone to receive courtesy signals from each courtesy signal transmitter,
        (iii) possibly a steering wheel, brakes and accelerator pedal which controls the speed and direction the moving vehicle will go, and
        (iv) if said steering wheel, brake and accelerator pedals control the vehicle are in said contiguous interior compartment, a moving vehicle driver, who may also be said cell phone user, may be positioned to operate said steering wheel and brake and accelerator pedals, wherein said cell phone's keyboard may be enabled or disabled based on courtesy signal transit times and the motion indicator, said enabling or disabling which may be overridden by signals or commands received from the cell phone service provider or person of authority located in said motion vehicle's contiguous interior compartment.

2. A system as defined in claim 1 wherein said courtesy signal is an ultrasonic serial binary signal.

3. A system as defined in claim 1 wherein said courtesy signal is a radio-frequency serial binary signal.

4. A system as defined in claim 1 wherein said motion detector determines motion from a conventional GPS receiver, which determines speed by calculating change of position per time interval, and determining motion as having a speed above a predetermined value.

5. A system as defined in claim 1 wherein said motion detector determines motion from the moving vehicle's speedometer, determining motion as having a speed above a predetermined value.

6. A system as defined in claim 1 wherein said motion detector determines motion from the presence of a signal from an accelerometer, determining motion as the sensor having a magnitude of vibration found to be above a predetermined value.

7. A system as defined in claim 1 wherein said motion detector determines motion from the presence of road, engine or wind noise, determining motion as the noise-reading microphone having magnitude of noise found to be above a predetermined value.

8. A system as defined in claim 1 whose moving vehicle has a stereo system comprising at least four speakers disposed within its interior compartment, wherein said courtesy signal transmitters are disposed within said speakers.

9. A system as defined in claim 1 wherein the location of the cell phone in the vehicle's contiguous interior compartment is determined by a process that uses the transit time for four courtesy signals transmitted to said cell phone and evaluates the data following the evaluation done in conventional GPS systems.

10. A system as defined in claim 1 wherein the location of the cell phone in the vehicle's contiguous interior compartment is determined by trilateration that uses any three of the four courtesy signal transit times.

11. A system as defined in claim 1 wherein the driver's cell phone's keyboard is enabled or disabled based on testing according to the order: if no courtesy signals are received by said courtesy signal receiver the cell phone's keyboard is disabled, otherwise if the cell phone is found to be not located near the vehicle's steering wheel the cell phone's keyboard is enabled, otherwise if the vehicle is found to be moving the cell phone's keyboard is disabled, otherwise cell phone's keyboard is enabled.

12. A system as defined in claim 1 wherein said driver's cell phone's keyboard is enabled or disabled based on testing according to the order: if the vehicle is found to be not moving the cell phone's keyboard is enabled, otherwise if no courtesy signals are received by said courtesy signal receiver said cell phone's keyboard is disabled, otherwise if said cell phone is found to be not located near the vehicle's steering wheel said cell phone's keyboard is enabled, otherwise said cell phone's keyboard is disabled.

13. Means for the cell phone user to override a system according to claim 1 to enable said cell phone's keyboard when it should be disabled, by feeding fake courtesy signals to said courtesy signal receiver.

14. A system as defined in claim 1 wherein said driver's cell phone's keyboard is enabled or disabled based on testing according to the order: if courtesy signals are received by said courtesy signal receiver and if the vehicle is found to be moving and if said cell phone is found to be located near said vehicle's steering wheel said cell phone's keyboard is disabled, otherwise said cell phone's keyboard is enabled.

15. Means for the cell phone user to override a system according to claim 1 to enable cell phone's keyboard when it should be disabled, by squelching a courtesy signal sent from said courtesy signal transmitter to said courtesy signal receiver.

16. An overriding operation according to claim 1 wherein the cell phone provider enables otherwise disabled keyboards, such as to handle an emergency, having at least part of said operation being done within said motion vehicle's contiguous interior compartment.

17. An overriding operation according to claim 1 wherein the cell phone provider changes the cell phone's action of disabling the keyboard, to the action of printing an error message on the cell phone, having at least part of said operation being done within said motion vehicle's contiguous interior compartment.

18. An overriding operation according to claim 1 wherein a person of authority over the moving vehicle, such as a train conductor over a train, who is located in the moving vehicle's contiguous interior compartment, enables all cell phones within said moving vehicle's contiguous interior compartment.

19. An overriding operation according to claim 1 wherein a person of authority over the zone, such as a parent, who is located in the moving vehicle's contiguous interior compartment, can disable the keyboards of any or all passenger's cell phones, for instance in order to punish cell phone user(s) for bad behavior, having at least part of said operation being done within said moving vehicle's contiguous interior compartment.

* * * * *